C. E. KELLY.
HORSESHOE CALK SHARPENER.
APPLICATION FILED NOV. 4, 1915.
1,180,727.                                    Patented Apr. 25, 1916.
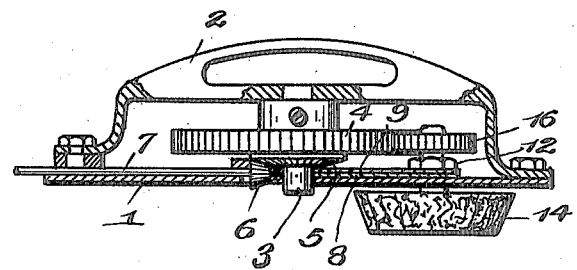
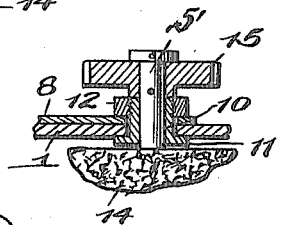
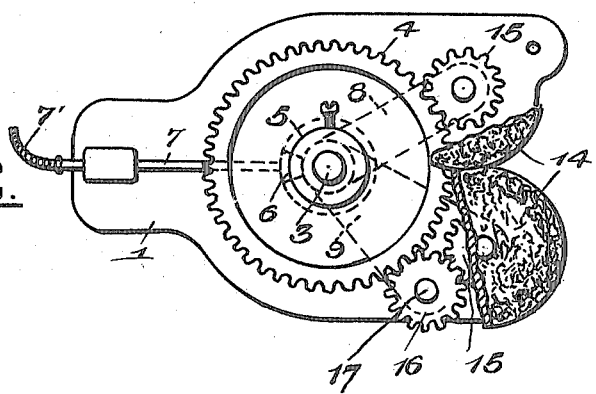
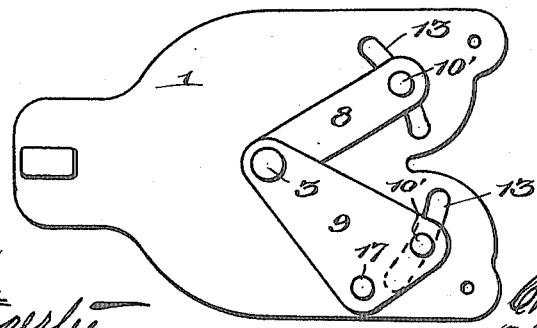
INVENTOR.
Charles E. Kelly
Joseph A. Miller
ATTORNEY.

UNITED STATES PATENT OFFICE.

CHARLES E. KELLY, OF PROVIDENCE, RHODE ISLAND.

HORSESHOE-CALK SHARPENER.

1,180,727.  Specification of Letters Patent.  Patented Apr. 25, 1916.

Application filed November 4, 1915. Serial No. 59,669.

*To all whom it may concern:*

Be it known that I, CHARLES E. KELLY, a citizen of the United States, residing at Providence, in the county of Providence and State of Rhode Island, have invented a new and useful Improvement in Horseshoe-Calk Sharpeners, of which the following is a specification.

This invention relates to certain new and useful improvements in horseshoe calk sharpeners, and the primary object thereof is to provide a sharpener of this type which is of simple, compact and economical structure so as to be easily and conveniently manipulated by the operator to sharpen the calks without removing the shoe from the hoof of the horse.

A further object of the invention is to provide a sharpener in which a pair of grinders are employed which grinders conjointly sharpen the calk into a V-shaped or knife edge.

Still further, the invention aims to provide means whereby the grinders may be adjusted to approach or recede from one another thereby to obtain different adjustments suited to calks of varying sizes or varying degrees of angularity between the sides of the calks that are to be sharpened.

In the drawings—Figure 1 is a side elevation, parts being broken away and in section. Fig. 2 is a top plan view, the handle being omitted and the grinders shown in fragment. Fig. 3 is a top plan view, parts being omitted. Fig. 4 is a vertical sectional detail view of the cutter mounting.

In accordance with the present invention, a plate 1 is employed to which a handle 2 is secured. A stub shaft 3 is journaled in the plate and handle and bears a gear wheel 4 and a bevel pinion 5, the latter meshing with a similar drive pinion 6 connected to a shaft 7, the latter being disposed over the plate 1 and driven by a flexible shaft 7'.

A pair of arms 8 and 9 are pivoted at their inner ends to shaft 3 and at their outer ends are perforated to receive sleeves 10 threaded at their tops and having flanges 11 at their bases which engage beneath plate 1. Nuts 12 threaded over the tops of sleeves 10 are employed to rigidly clamp the sleeves to plate 1, the sleeves passing through apertures 10' formed therefor in arms 8 and 9 and through curved slots 13 formed in plate 1 so that various adjustments of the sleeves may be obtained as regards the space between the sleeves, in which regard see Fig. 3 of the drawings.

The grinders 14 are secured to short shafts or shanks 15', the latter being rotatably passed through the sleeves 10 and have the gears 15 keyed thereto. One of the gears 15 directly meshes with main gear 4 while the other gear 15 meshes with a gear 16 mounted on arm 9 by means of a stub shaft 17, so that both grinders are thereby rotated in the same direction.

By manipulation of the nuts 12 the grinders may be moved so as to provide more or less space therebetween as desired which enables calks of different thicknesses to be cut or sharpened.

In operation the shaft 7 is revolved thereby driving the grinders in unison, and by grasping the handle 2, the operator may present the two grinders to the bottom or ground engaging end of the calk receiving the latter in the approximately V-shaped space formed by and between the grinders as depicted in Fig. 2 of the drawings.

Having thus described my invention, what I claim as new and desire to secure by Letters Patent:—

1. In a calk sharpener, a plate having a handle thereon and formed with a pair of curved slots, a shaft journaled in and disposed between the plate and handle and having a main gear thereon, a drive shaft on the plate having a bevel pinion thereon, a bevel gear on the first shaft meshed with said bevel pinion, a pair of arms pivoted on the shaft, a gear borne by one of the arms and meshed with the main gear, flanged sleeves passed through the arms and slots with their flanges abutting beneath the plate, nuts threaded on the sleeves to draw the flanges thereof into binding engagement with the plate to hold the arms stationary, and shafts rotatable in the sleeves and having gears one of which latter gears meshes with the main gear and the other of which meshes with the said gear borne by one of the arms.

2. In a calk sharpener, a driving gear, a body on which the gear is journaled provided with spaced curved slots concentric with the axis of the gear, a sleeve adjustable in each slot of the body, a grinder journaled in each sleeve on one side of the body, and a driven gear for each grinder operable by the driving gear and disposed on the other side of the body.

3. In a calk sharpener, a flat plate-like body having spaced slots, a sleeve adjustable in each slot of the body, a driving gear journaled on the body, a pair of arms pivotally connected concentrically to the gear and each secured to a sleeve, a stub shaft in each sleeve, a grinder on each stub shaft on one side of the body, and a driven gear on each shaft operable by the driving gear and disposed on the opposite side of the body.

4. In a calk sharpener, a flat plate-like body, a driving gear journaled thereon, a handle secured to the plate and straddling the gear, said handle constituting a bearing for the driving gear, a pair of grinders adjustable on the body and on opposite sides of the handle, and means operatively connecting the grinders to the gear.

In testimony whereof I have signed my name to this specification in the presence of two subscribing witnesses.

CHARLES E. KELLY.

Witnesses:
ADA E. HAGERTY,
J. A. MILLER.

Copies of this patent may be obtained for five cents each, by addressing the "Commissioner of Patents, Washington, D. C."